Figure 4:
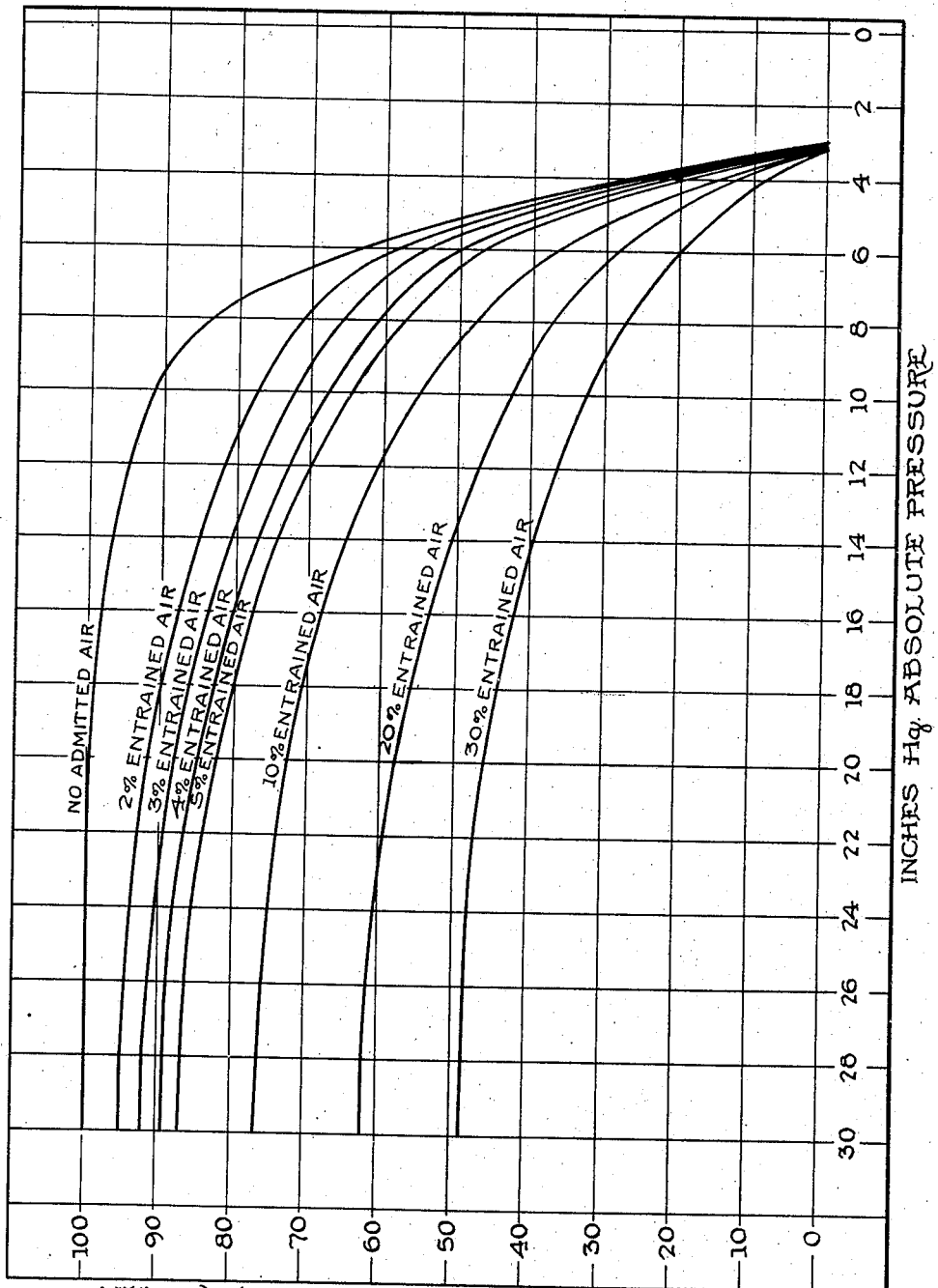

Aug. 20, 1946.    B. R. WALSH ET AL    2,406,179
METHOD AND APPARATUS FOR MEASURING AIR ENTRAINMENT
Filed Nov. 24, 1943    2 Sheets-Sheet 1
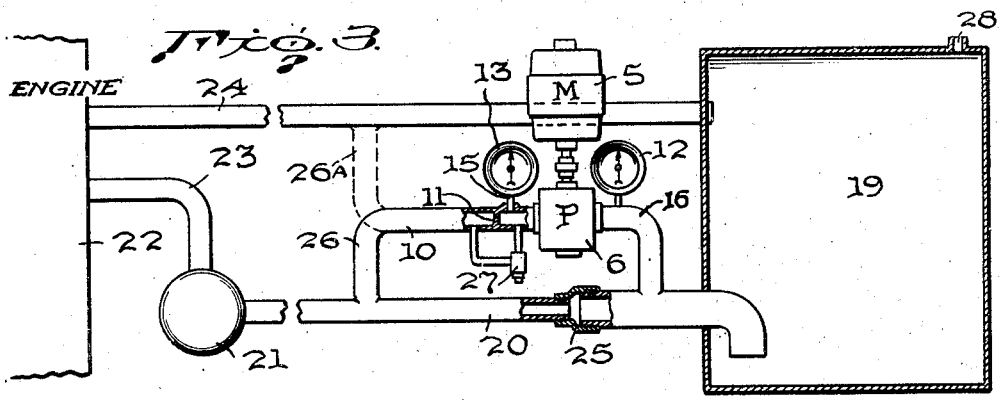
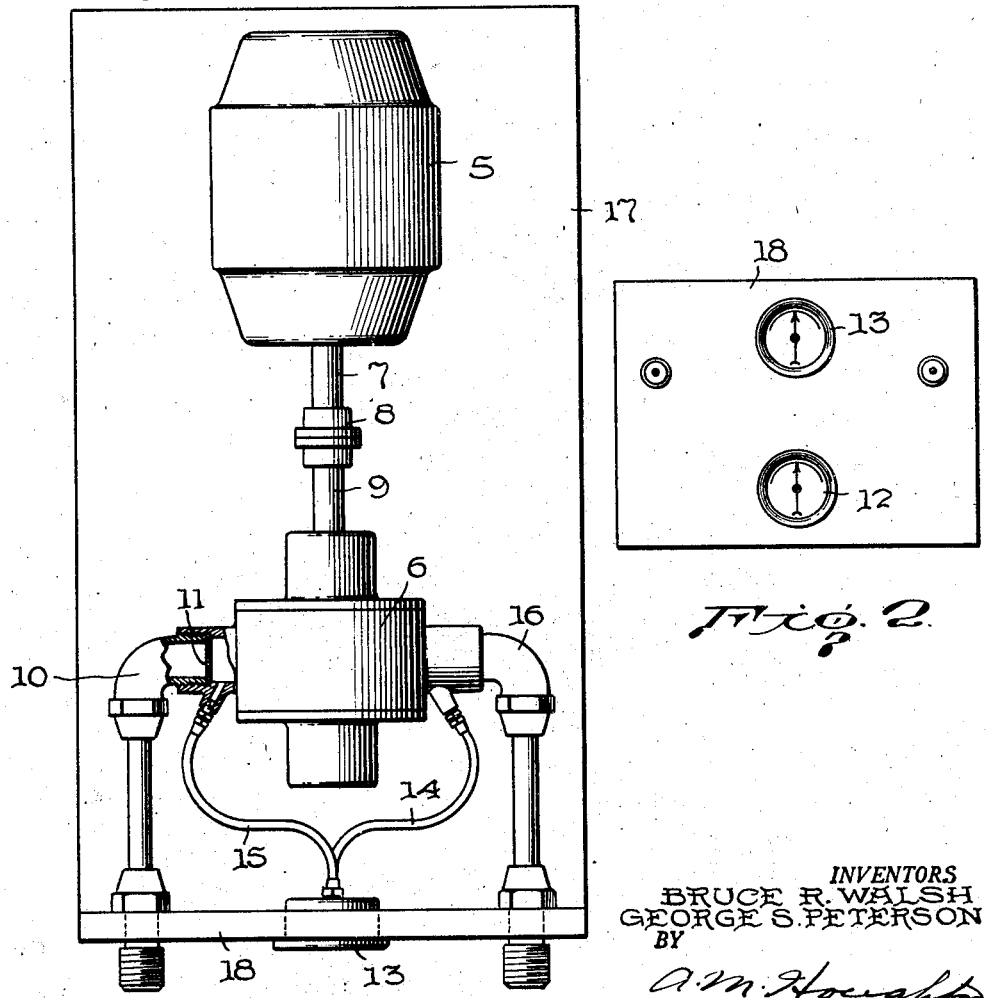
INVENTORS
BRUCE R. WALSH
GEORGE S. PETERSON
BY
ATTORNEY Patented Aug. 20, 1946

2,406,179

UNITED STATES PATENT OFFICE 2,406,179

METHOD AND APPARATUS FOR MEASURING AIR ENTRAINMENT

Bruce R. Walsh, Wilkinsburg, and George S. Peterson, Penn Township, Allegheny County, Pa., assignors, by mesne assignments, to Wright Aeronautical Corporation, Paterson, N. J., a corporation of New York Application November 24, 1943, Serial No. 511,604

7 Claims. (Cl. 73—53)

This invention relates to methods and apparatus for measuring air entrainment, useful for determining the presence and percentage of gas in liquid or semi-liquid materials, such for instance as lubricating oil, grease, plastic material, oil well drilling mud and the like. More particularly the invention is concerned with methods and apparatus for continuously indicating the percentage of gas at a point in a flowing stream of such liquid or semi-liquid material.

In many modern hydraulic installations it is desirable, if not imperative, to know of the presence and percentage of gas in the liquid in the system. Thus, in some pressure lubricating systems the presence of an excess of entrained air or gas in the lubricant may seriously impair its efficiency. Mud used in drilling oil wells may sometimes become so laden with air or gas that disaster results. Hydraulic systems for transmitting energy may operate erratically or fail completely if air becomes mixed with the liquid used, and liquid feeding devices may fail to function or measure accurately.

It is old in the art to which this invention relates to determine the percentage of gas in liquid or semi-liquid material by examination of individual samples of the material. One such method involves securing a measured volume of the material to be tested and subjecting it to pressure in a closed container whereby its volume is reduced. Another method consists in comparing the weight of a volume of material of known gaseous content with the weight of an equal volume of material of unknown gaseous content. However, such methods are discontinuous and are limited for the most part to use in the laboratory.

Apparatus involving the use of electric circuits containing electrical condensers, resistances or light sensitive electric cells have been proposed for continuously indicating the percentage of gas in liquids but these devices, while possibly sound theoretically, are complicated and delicate and have not proven entirely satisfactory under practical conditions of operation.

It is an object of the present invention to provide an improved method for continuously indicating the percentage of gas entrained in liquids.

A further object of the invention is to provide a strong and durable, inexpensive and simply constructed direct reading apparatus for continuously and accurately indicating the presence or absence, or change in percentage of gas in liquids, semi-liquids, plastic material, or liquids containing solids.

A further object of the invention is to provide a continuously operating indicator of the character described which shall be small in size and of a few number of parts and which may be portable or be a permanent part of almost any type of hydraulic installation, as for example the lubricating system of an airplane engine, a hydraulic brake or power transmission system or a system for handling liquids such as a liquid feeding or measuring device.

A further object of the invention is the provision of continuous indicating means of the character described which may be connected at almost any point in a hydraulic system, such as to a reservoir or to a flowing stream of liquid, and which will not interfere with the normal operation of the system.

According to the present invention use is made of a rotary positive displacement pump provided with a fixed orifice discharge. The inherent characteristics of such a device, when pumping liquids containing entrained air, are such that when operated at constant speed the discharge pressure of the pump falls off or decreases with increase in the percentage of air or gas in the liquid. With a fixed orifice in the pump outlet which requires a definite discharge pressure for each pump flow rate, the discharge pressure of the liquid pumped falls off with decreasing inlet absolute pressure, in a manner to be described, because the flow falls off. Thus a still further object of the invention is the provision of apparatus of the character described embodying continuously operated, positive displacement means, advantageously a substantially constant speed rotary pump.

These and other objects of the present invention are accomplished by the present invention as will be apparent from the following description and accompanying drawings, wherein, Fig. 1 is a top plan view, partly in section, of the indicator of the present invention;

Fig. 2 is a front plan view of the apparatus shown in Fig. 1;

Fig. 3 is a diagrammatic view, partly in section, and shows one form of apparatus of the present invention connected to the lubricating system of an engine; and Fig. 4 is a chart in which indicator inlet and outlet pressures are graphically illustrated by curves for lubricating oil containing various percentages of air at different altitudes, as when the oil is used to lubricate an airplane engine.

Referring to the drawings and more particularly to Figs. 1 and 2, wherein like numerals indicate corresponding parts throughout the several views, the indicator consists of an electric motor 5, the speed of which is readily controlled or which is substantially constant, and a rotary, positive displacement pump 6 such for example as a gear pump. The drive between the motor and the pump is advantageously direct from the motor shaft 7 through coupling 8 to pump shaft 9. Positioned in the outlet or discharge side 10 of the pump is a fixed, preferably thin disk type orifice 11, the effect of which is to establish a definite discharge pressure for each pump flow rate. Pump inlet and discharge pressures are measured by means of gages 12 and 13, respectively, connected through tubes 14 and 15 with the inlet and discharge sides of the pump. Discharge pressure gage 13 is connected to the pump discharge line intermediate pump 6 and orifice 11, while the inlet pressure gage is connected to pump inlet pipe 16. As shown, the motor and pump are mounted on a base member 17 while the gages and inlet and outlet pipe connections are supported on an upright front panel 18 secured to the base.

With the indicator as so far described, the volume of liquid delivered by pump 6 is a function of the relative volumes of air and liquid with a given inlet pressure, while the discharge pressure of the pump is a direct function of the volume of liquid flowing through the fixed thin-disk orifice. In general the pressure required for forcing a given volume of liquid material of generally similar physical characteristics through a fixed, thin-disk or turbulent type orifice is substantially independent of the viscosity of the liquid.

Since the operation of the indicator is largely dependent upon the inherent characteristics of the indicator pump, each pump or installation is advantageously calibrated for its particular operational characteristics with liquids containing different known percentages of entrained gas. This may be accomplished by simply operating the pump at a constant speed during the passage of such liquids therethrough and noting the outlet pressures developed for various different inlet pressures. Referring to Fig. 4, for instance, it is shown that with a constant inlet pressure of 30 inches of mercury (approximately atmospheric pressure) the indicator will develop 100 pounds pressure per square inch when operated with liquids containing no air or gas. With liquids containing 2 per cent of entrained air the discharge pressure, however, is only 95 pounds per square inch, while with liquids containing 20 per cent air the discharge pressure as recorded by gage 13 is only about 62 pounds per square inch, etc. Likewise, Fig. 4 shows that with decrease in inlet pressure below atmospheric, the discharge pressure as recorded by gage 13 for liquids containing 2 per cent entrained air, drops from approximately 95 pounds per square inch at atmospheric pressure to 85 pounds at a pressure of 14 inches of mercury absolute. The device can of course be operated with inlet pressures above atmospheric as well as below atmospheric. The specific liquid operated upon to give the results shown in Fig. 4 is Gulfpride lubricating oil, S. A. E. 60, at 185° F.

When the liquid operated upon is at a different temperature from the liquid used in preparing the chart corrections of course must be made for temperature. When liquids or plastic materials of widely varying physical characteristics are used the device is best calibrated for each such liquid.

In Fig. 3 the apparatus above described is shown diagrammatically in connection with a conventional form of airplane, internal combustion engine lubricating system for the purpose of indicating the amount of gas entrained in the oil passing from the oil supply reservoir to the engine. In this showing, 19 represents a tank or reservoir of lubricating oil having an air vent 28 and connected by means of pipe 20 with the pressure oil lubricating pump 21 of the engine 22. Discharge from pump 21 to the engine is by means of pipe 23. Return of lubricating oil from the engine to the reservoir is through pipe 24 by means of the engine scavenge pump, not shown. Included in the return may be the usual oil filter and oil cooler, also not shown. In connecting the indicating apparatus in the system it is advantageous to provide pipe 20 with a reducing coupling 25 and to connect the indicator inlet pipe 16 to pipe 20 at some point on the enlarged or reservoir side of the reducer. With such an arrangement, oil withdrawn from pipe 20 by the indicator pump does not appreciably affect the feed of oil to the pressure lubricating pump 21 and a continuous sample of the oil flowing through pipe 20 is bypassed through pipe 16. Discharge from the indicator is preferably by means of pipe 10 and pipe 26 to pipe 20. The connection of pipe 26 with pipe 20 is ahead of pump 21. In an alternate arrangement the discharge from the indicator is by means of pipe 10 and pipe 26—A to pipe 24. When this arrangement is used the connection with pipe 24 is preferably immediately adjacent the reservoir or between the reservoir and adjacent apparatus such as the oil cooler or filter at a point where the pressure is substantially that of the tank.

To prevent stalling and damage to the indicator in event orifice 11 becomes plugged, a by-pass including a pressure relief valve 27 is provided across the orifice, as shown.

In operation, considering the plane to be flying at some height corresponding to 18 inches of mercury absolute indicator inlet pressure as recorded on gage 12, and the outlet pressure gage of the air entrainment indicator registers 70 pounds pressure per square inch, the pilot has merely to refer to a calibration chart such as shown in Fig. 4 to determine that the lubricating oil passing to the pressure lubricating pump and on to the bearings of the motor contains approximately 10 per cent entrained air. If, on the other hand, the indicator outlet pressure gage reads only 49 pounds per square inch at an absolute inlet pressure of 18 inches of mercury, reference to the chart will indicate to the pilot that the oil contains approximately 25 per cent entrained air.

Differences in temperature between the liquid material tested and that used in calibrating the instrument may sometimes require the use of additional charts. That is, the instrument may be calibrated for different oil temperatures by making a separate chart for each oil temperature or a single such chart may be provided with a conversion table setting forth the necessary corrections of the chart for different oil temperatures. However since the temperature of the oil in the reservoir of an airplane lubricating system is maintained substantially constant by the use of automatic thermostatic controls a single chart representing the operation of the indicator at the temperature used is generally sufficient.

The apparatus above described is simple in construction, reliable and accurate in operation and inexpensive in manufacture. Through its use the total amount of gas present in the material handled is indicated regardless of whether the gas be simply entrained or mechanically admixed with the material or liberated from solution in the liquid by the drop in pressure in the system. While the invention is particularly meritorious in airplane lubricating systems it is well adapted for wide application in industry.

What is claimed is:

1. The method of continuously indicating the percentage of gas in a liquid-gas mixture which comprises preparing a calibration chart of a positive displacement pump driven at constant speed and discharging through a constant resistance, in which pump discharge pressures are plotted against pump inlet pressures for liquids containing various known percentages of entrained gas, thereby obtaining a series of characteristic curves, pumping a liquid containing an unknown percentage of entrained gas with said pump at said speed and through said resistance, determining the inlet and outlet pressures of the liquid and noting the percentage of entrained gas in the liquid represented on the chart by the curve having the nearest comparative corresponding pressure readings.

2. The subject matter of claim 1 wherein the inlet temperatures of the liquid-gas mixture used in preparing the calibration chart of the positive displacement pump and the liquid-gas mixture containing an unknown percentage of entrained gas are made equal.

3. The subject matter of claim 1 wherein a plurality of said charts are prepared corresponding to operations of the positive displacement pump with liquid-gas mixtures of different temperatures, determining the temperature of the unknown liquid-gas mixture and referring to the chart representing operation of the pump nearest the temperature of the unknown liquid-gas mixture for determining the percentage gas present in said liquid.

4. In combination with a system including a flowing stream of liquid containing entrained gas, a by-pass in said system, a positive displacement pump in said by-pass, means for determining the pressure of the liquid-gas mixture entering the pump, a fixed fluid flow resistance in the outlet of the pump, a pressure gage in the outlet of the pump intermediate the pump and the resistance and means for driving the pump at a substantially constant speed whereby a difference in pressure across said pump is obtained, said difference being less the greater the percentage of gas present with the liquid.

5. In apparatus for measuring the quantity of gas entrained in a mixture of liquid and gaseous material, the improvement comprising a positive displacement pump, inlet and outlet connections for the pump, a pressure gage arranged to indicate the pressure of the liquid-gas mixture on the inlet side of the pump, a fixed orifice resistance in said pump outlet connection, a pressure gage connected to the pump outlet intermediate the pump and the orifice resistance, and means for driving the pump at a substantially constant speed whereby a difference in pressure across said pump is obtained, said difference being less the greater the percentage of gas present with the liquid.

6. Apparatus for use with a calibration chart of a positive-displacement pump operating at a given speed, said chart showing the relation between the pump inlet and outlet pressures when pumping liquid-gas mixtures of various-known percentages of gas through a fixed restricted orifice; said apparatus comprising a positive-displacement pump for which said chart is calibrated, means for operating said pump at said given speed, a fixed restricted orifice similar to the orifice upon which said chart is based, said pump being arranged to pump a liquid-gas mixture through said orifice, means for measuring the pump inlet pressure, and means for measuring the pump outlet pressure upstream of said orifice.

7. Apparatus for measuring the quantity of gas in a liquid-gas mixture, said apparatus comprising a positive-displacement pump, a restricted passage through which said pump is arranged to pump said mixture, means for operating said pump at a substantially constant speed, means for measuring the pump intake pressure, and means for measuring the pump discharge pressure upstream of said restricted orifice.

BRUCE R. WALSH.
GEORGE S. PETERSON.